(12) United States Patent
Peterson

(10) Patent No.: US 12,735,001 B2
(45) Date of Patent: Sep. 15, 2026

(54) MOBILE EQUIPMENT OPTIMIZED FOR A SWAPPABLE BATTERY SOLUTION

(71) Applicant: Caterpillar Inc., Peoria, IL (US)

(72) Inventor: Grant Steven Peterson, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 311 days.

(21) Appl. No.: 18/233,051

(22) Filed: Aug. 11, 2023

(65) Prior Publication Data

US 2025/0050840 A1 Feb. 13, 2025

(51) Int. Cl.

*B60K 1/04* (2019.01)
*B60L 53/80* (2019.01)
*B60S 5/06* (2019.01)
*B60K 17/00* (2006.01)

(52) U.S. Cl.

CPC .................. *B60S 5/06* (2013.01); *B60K 1/04* (2013.01); *B60L 53/80* (2019.02); *B60K 2001/0411* (2013.01); *B60K 2001/0455* (2013.01); *B60K 2001/0483* (2013.01); *B60K 2001/0494* (2013.01); *B60K 17/00* (2013.01); *B60L 2200/40* (2013.01)

(58) Field of Classification Search

CPC ..... B60L 7/26; B60L 2240/461; B60K 23/04; B60K 2023/046; B60K 17/18; B60K 17/16; B60K 1/04–2001/0494; F16H 48/20; F16H 2048/204; F16H 48/22

See application file for complete search history.

(56) References Cited

U.S. PATENT DOCUMENTS

| | | | | |
|---|---|---|---|---|
| 3,984,141 | A | 10/1976 | Case | |
| 5,275,525 | A | 1/1994 | Grumblatt | |
| 5,598,083 | A * | 1/1997 | Gaskins | B60L 50/66 108/65 |
| 7,401,673 | B2 | 7/2008 | Komatsu | |
| 9,227,601 | B2 | 1/2016 | Corfitsen | |
| 2010/0181129 | A1 | 7/2010 | Hamidi | |
| 2015/0071747 | A1* | 3/2015 | Deahl | B60K 1/04 414/469 |
| 2019/0263269 | A1* | 8/2019 | Huff | B60K 1/04 |

(Continued)

FOREIGN PATENT DOCUMENTS

| | | | |
|---|---|---|---|
| CN | 103241111 | A | 8/2013 |
| CN | 108944830 | A | 12/2018 |
| CN | 112026577 | A | 12/2020 |

(Continued)

*Primary Examiner* — Tinh T Dang

(57) ABSTRACT

Typically, the recharging process for a battery-powered mobile equipment involves driving or otherwise moving the mobile equipment to the location of a stationary recharging station, and recharging the battery of the mobile equipment at the recharging station. During the time of travel and recharging, the mobile equipment is not performing a task in the field. Disclosed embodiments eliminate or reduce the need to transport the mobile equipment to recharging stations. In particular, disclosed embodiments comprise a frame that enables battery packs to be quickly swapped, potentially in the field. Embodiments may comprise movement elements to facilitate swapping and/or a mobile battery-swapping system that can transport battery packs to and from the mobile equipment in the field.

15 Claims, 5 Drawing Sheets

(56) References Cited

U.S. PATENT DOCUMENTS

2019/0263270 A1* 8/2019 Huff ........................ B60L 53/80

FOREIGN PATENT DOCUMENTS

| | | | |
|---|---|---|---|
| CN | 112297941 | A | 2/2021 |
| DE | 102006031461 | A1 | 1/2008 |
| DE | 102013110811 | A1 | 4/2015 |
| DE | 102017121571 | A1 | 3/2019 |
| EP | 1925512 | A1 | 5/2008 |
| EP | 3599213 | A1 | 1/2020 |
| EP | 4019456 | A1 | 6/2022 |
| KR | 102456232 | B1 | 10/2022 |

* cited by examiner

MOBILE EQUIPMENT OPTIMIZED FOR A SWAPPABLE BATTERY SOLUTION

TECHNICAL FIELD

The embodiments described herein are generally directed to swapping battery packs, and, more particularly, to mobile equipment optimized for swapping battery packs at industrial sites.

BACKGROUND

In some industrial contexts, such as construction, mining, farming, forestry, and the like, battery-powered mobile equipment may operate in remote locations, such as off-road locations, where no supporting infrastructure exists. Access to these sites can potentially be a complex task due to several factors specific to these environments. Mobile equipment often operate in demanding and dynamic conditions, requiring continuous usage throughout the day. The process of recharging the batteries of such mobile equipment can be time-consuming. Therefore, it becomes costly for businesses to operate an efficient recharging process.

Traditionally, industrial sites may have limited infrastructure for charging mobile equipment. The availability and placement of charging stations need to be carefully planned to ensure convenient access and avoid congestion. Furthermore, the power supply capacity at these locations might be limited, requiring careful management of energy resources to prevent overloading the electrical infrastructure or causing power disruptions.

In addition, the mobility of the equipment itself poses logistical challenges. Mobile equipment may need to be relocated to charging stations, which requires efficient coordination and management of operations to avoid disruptions or delays in workflow. The diversity of mobile equipment used in industrial sites further complicates the recharging process.

The present disclosure is directed toward overcoming one or more of the problems discovered by the inventors.

SUMMARY

In an embodiment, a battery-swapping assembly comprises a frame configured to support a battery pack, wherein the frame includes a body, two arms extending from the body, wherein each of the two arms includes a first end, joined to the body, and a second end, and a removable stiffener between the second ends of the two arms.

In an embodiment, a battery-swapping assembly comprises a frame configured to support a battery pack, wherein the frame includes a body, two arms extending from the body, wherein each of the two arms comprises a first end, joined to the body, and a second end, a removable stiffener between the second ends of the two arms, a movement system, wherein the movement system includes two or more movement elements, wherein each of the two or more movement elements includes a cylinder barrel, a piston rod that is configured to extend outward from the cylinder barrel and contract inward into the cylinder barrel, and an attachment point at an end of the piston rod, and wherein each attachment point is configured to attach to the battery pack; a first traction motor coupled to a first one of the two arms; a first ground-engaging member that is driven by the first traction motor; a second traction motor coupled to a second one of the two arms; and a second ground-engaging member that is driven by the second traction motor.

In an embodiment, a battery-swapping system comprises a mobile equipment that includes a frame configured to support a battery pack, wherein the frame includes a body, two arms extending from the body, wherein each of the two arms comprises a first end, joined to the body, and a second end, and a removable stiffener extending across an area between the second ends of the two arms; and a mobile battery-swapping system comprising a platform configured to move one or both of vertically or horizontally, wherein the platform is configured to engage and carry the battery pack through the area between the seconds ends of the two arms while the removable stiffener is removed.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
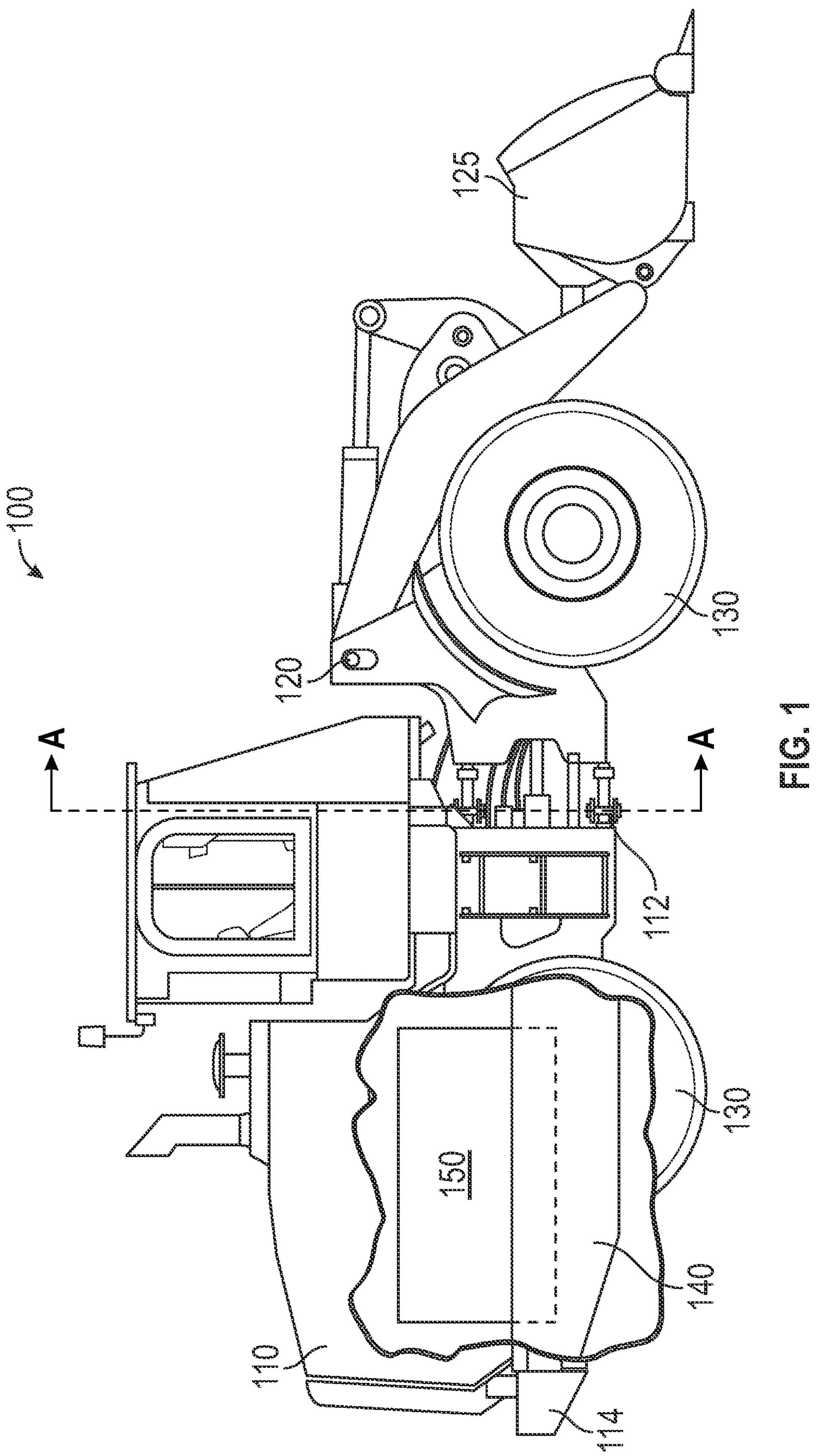
FIG. 1 illustrates a side view of an electric mobile equipment, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details.

In some instances, well-known structures and components are shown in simplified form for brevity of description. For clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings.

FIG. 1 illustrates a side view of an electric mobile equipment 100, according to an embodiment. Mobile equipment 100 is illustrated as a wheel loader. However, mobile equipment 100 may be any equipment that is powered by an onboard battery pack. Other examples of mobile equipment 100 include, without limitation, an excavator, dump truck, asphalt paver, backhoe loader, skid steer, track loader, cold planer, compactor, dozer, electric rope shovel, forest machine, hydraulic mining shovel, material handler, motor grader, pipe-layer, road reclaimer, telehandler, tractor-scraper, or the like. Mobile equipment 100 may be operated by a human (e.g., locally or remotely) and/or by an autonomous system.

In the illustrated example, mobile equipment 100 includes a rear portion 110 and a front portion 120 that includes a worktool 125. Front portion 120 may be articulated with respect to rear portion 110, by virtue of a joint 112, such that front portion 120 is capable of rotating within a range of degrees, relative to rear portion 110, around an axis A. However, it should be understood that disclosed embodiments do not require mobile equipment 100 to comprise an articulated front portion 120. In an alternative example, mobile equipment 100 may comprise non-articulated front and rear portions (e.g., a single, integrated body frame).

Mobile equipment 100 may comprise at least one, and generally a plurality of, ground-engaging members 130. Ground-engaging members 130 are illustrated as wheels. In an alternative embodiment, ground-engaging members 130 may comprise a track or pair of tracks. More generally, ground-engaging member(s) 130 may comprise any mechanism for supporting mobile equipment 100 above the ground, and preferably moving mobile equipment 100 relative to the ground.

Rear portion 110 of mobile equipment 100 comprises a rear bumper 114 on the rear end. Rear portion 110 also comprises a rear frame 140, which supports a battery pack 150. Rear frame 140 may be shaped in u-shape or an angled-ended. U-shaped frame 140 may allow battery pack 150 to be disconnected and lowered directly to the ground beneath the mobile equipment 150, allowing mobile equipment to pull forward, and then reverse to the next battery pack 150 and install it. Angle-ended frame 140 may allow a battery pack 150 to be lowered/slid off of mobile equipment 100 and to the ground, and mobile equipment to then drive and pick up the next battery pack 150. Battery pack 150 powers mobile equipment 100, including powering the motor(s) that drive ground-engaging member(s) 130, worktool 125, electronic control units (ECUs), electronics within the cabin, and/or the like.

Figure 2:
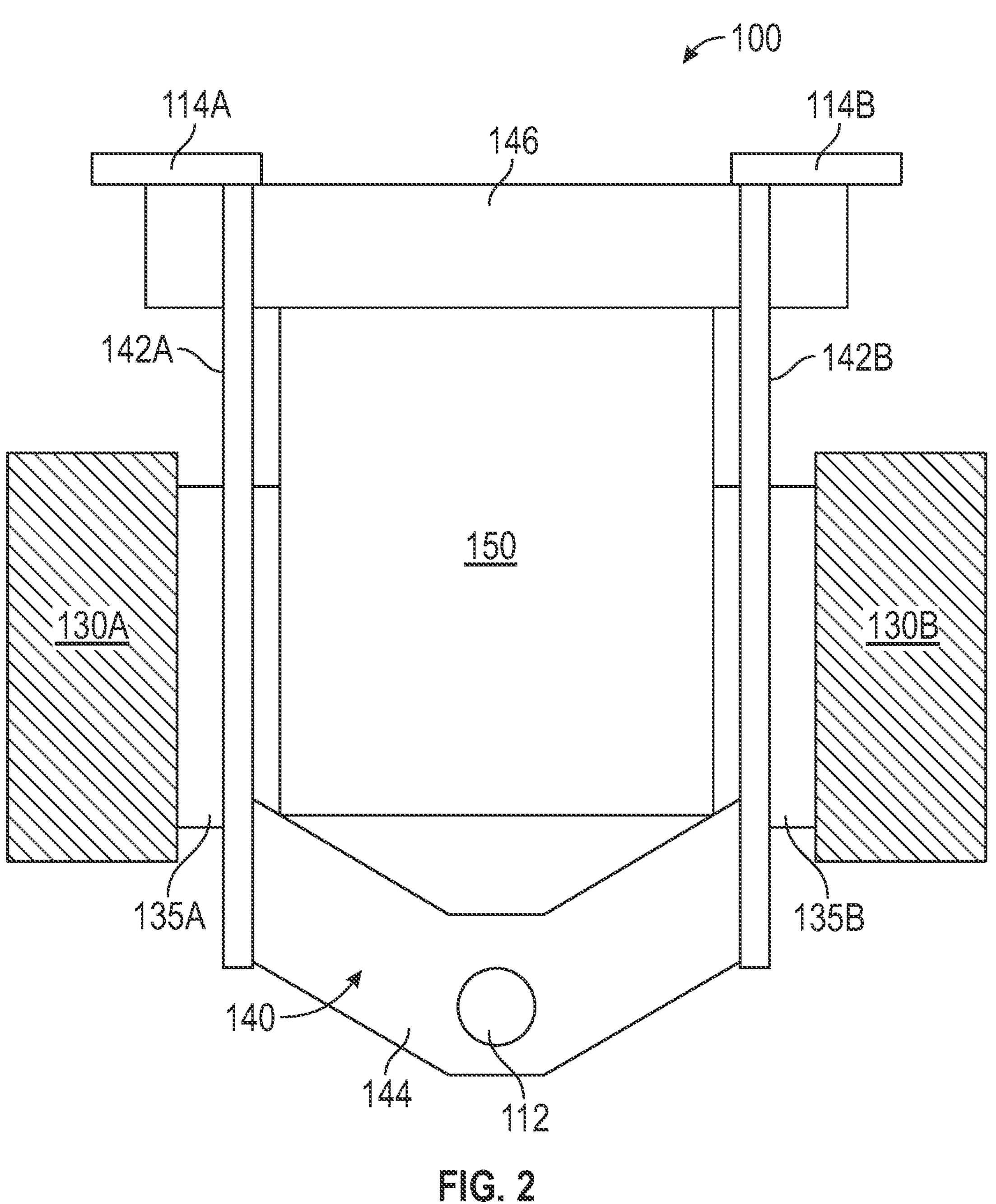
FIG. 2 illustrates a top-down schematic of a battery pack within an electric mobile equipment, according to an embodiment.

FIG. 2 illustrates a top-down schematic of a battery pack 150 within an electric mobile equipment 100, according to an embodiment. Battery pack 150 may be mounted within frame 140. For example, battery pack 150 may be mounted in the center of frame 140 for even weight distribution. In an embodiment, frame 140 is split around battery pack 150 to accommodate the significant dimensions of battery pack 150. In particular, frame 140 may comprise two arms 142A and 142B. Each of two arms 142A and 142B comprises a first end that is joined to body 144, as well as a second end at the rear of frame 140.

As used herein, a reference numeral without an appended letter, but with the same numerical component as a reference numeral with an appended letter, will be used to refer to that component generically. For example, the term "arm 142" may refer to either arm 142A or arm 142B, and the term "arms 142" may refer collectively to arms 142A and 142B.

In an embodiment, frame 140 also comprises a stiffener 146. Stiffener 146 may be positioned at the rear of battery pack 150, between the rear ends of arms 142A and 142B. When inserted between the rear ends of arms 142A and 142B, stiffener 146 supports arms 142A and 142B outwards. In particular, stiffener 146 supports arms 142 against buckling or other forces that may cause arms 142 to twist or otherwise collapse inwards.

In an embodiment, stiffener 146 may also extend vertically past the bottom of battery pack 150. Thus, stiffener 146 may prevent battery pack 150 from moving (e.g., translating) towards the rear of mobile equipment 100, in addition to providing support to arms 142. In addition, stiffener 146 may cover the rear of mobile equipment 100 to prevent exposure of battery pack 150 to the external environment of mobile equipment 100.

Stiffener 146 may be removable. For example, stiffener 146 may be configured to slide out through the rear end of mobile equipment 100, between portions 114A and 114B of rear bumper 114. In this case, stiffener 146 may completely detach from frame 140. Alternatively, stiffener 146 may rotate horizontally outwards or vertically up or down, without completely detaching from frame 140. In this case, stiffener 146 may be joined to frame 140 via a hinge or other joint mechanism. In either case, whether completely detachable or not, stiffener 146 may be removable from within the space between arms 142A and 142B, to thereby provide access to the compartment, in rear portion 110 of mobile equipment 100, in which battery pack 150 is mounted. When between arms 142A and 142B, stiffener 146 may be fastened to frame 140, in any known manner, to thereby prevent removal. For example, stiffener 146 may be fastened to frame 140 via bolts, screws, clips, latches, and/or the like.

In an embodiment, the size of battery pack 150 prevents an axle from being placed between ground-engaging members 130A and 130B on rear portion 110. In this case, each ground-engaging member 130 on rear portion 110 may be powered by a discrete traction motor 135. For example, ground-engaging member 130A may be powered by traction motor 135A, and ground-engaging member 130B may be powered by traction motor 135B. Each traction motor 135 may utilize motor reduction and an active suspension.

Figure 3A:
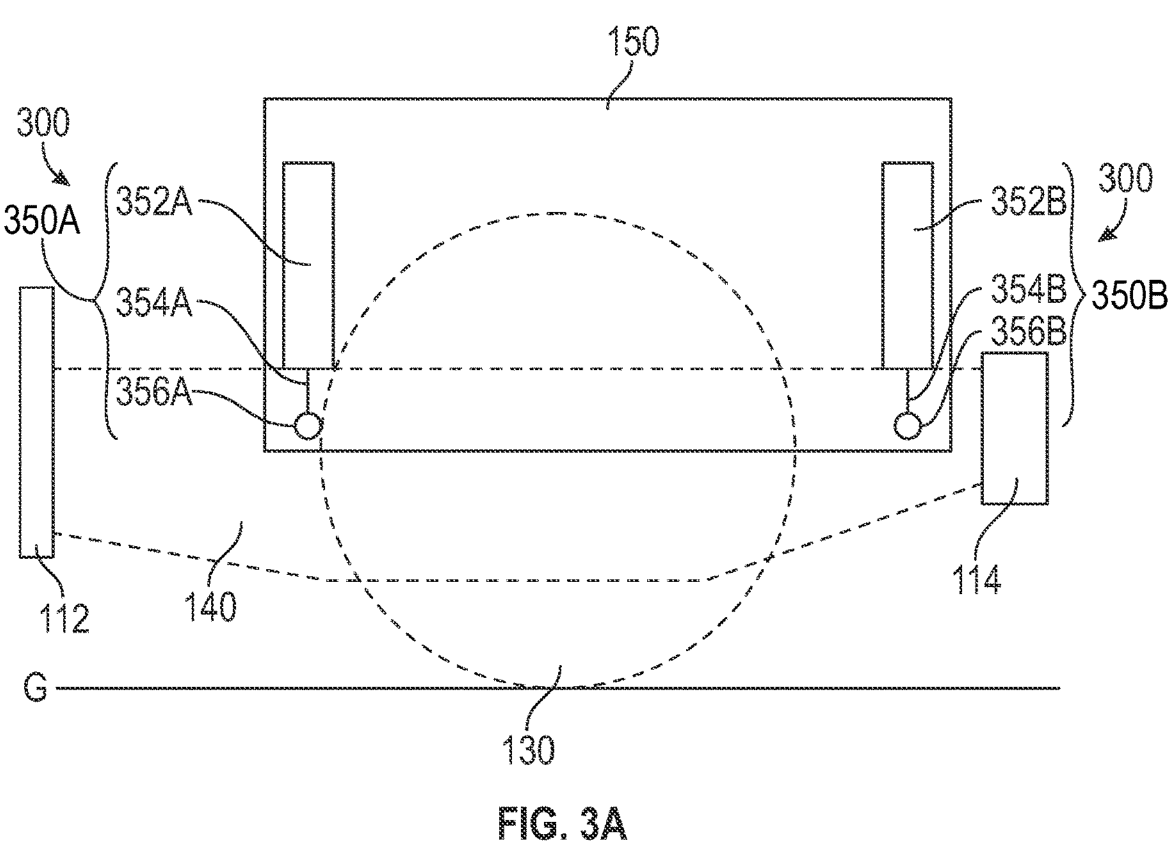
FIGS. 3A and 3B illustrate a vertical movement system for a battery pack, according to an embodiment.
Figure 3B:
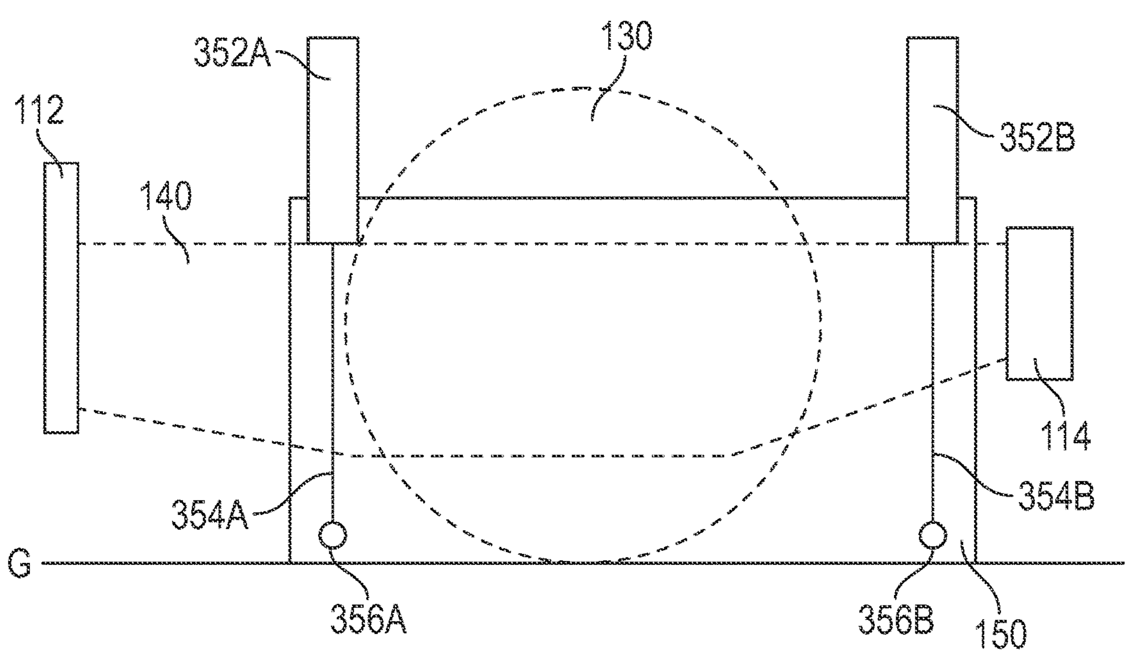

FIGS. 3A and 3B illustrate a vertical movement system 300 for a battery pack 150, according to an embodiment. Vertical movement system 300 may comprise one or more vertical movement elements 350, illustrated as a pair of vertical movement elements (e.g., first vertical movement element 350A near a front end of battery pack 150 and second vertical movement element 350B near a rear end of battery pack 150. It should be understood that an identical pair of vertical movement elements 350 may be positioned on the opposite side of battery pack 150, to provide a total of four vertical movement elements 350 near each corner of battery pack 150. The particular positions of vertical movement elements 350 are not limiting. However, for stability purposes, it is generally contemplated that a vertical movement element 350 would be positioned near each corner of battery pack 150, whether on the front, lateral, and/or rear sides of battery pack 150.

As illustrated in FIG. 3A, each vertical movement element 350 may be a cylinder, such as a hydraulic cylinder, or an electric actuator. In particular, each vertical movement element 350 comprises a cylinder barrel 352, a piston rod 354, and an attachment point 356. For example, first vertical movement element 350A comprises cylinder barrel 352A, piston rod 354A, and attachment point 356A, and second vertical movement element 350B comprises cylinder barrel 352B, piston rod 354B, and attachment point 356B. Each piston rod 354 may extend out of and contract into the respective cylinder barrel 352, and each attachment point 356 may be physically coupled to battery pack 150 using any known attachment mechanism (e.g., bolts, screws, etc.). Each cylinder barrel 352 may be fixed to frame 140 or other component of rear portion 110 of mobile equipment 100.

Each vertical movement element 350 may be operated in synchrony with each other vertical movement element 350. As each piston rod 354 extends out of cylinder barrel 352, battery pack 150 is gradually dropped vertically downward and out of rear portion 110 by virtue of the couplings between battery pack 150 and attachment points 356, as illustrated in FIG. 3B. Once on the ground G, battery pack 150 may be decoupled from attachment points 356, to thereby remove battery pack 150 from mobile equipment

100. Once removed, mobile equipment 100 may be moved forward and/or battery pack 150 may be moved rearward, to thereby separate mobile equipment 100 and battery pack 150, so that battery pack 150 may be serviced (e.g., recharged, reconditioned, etc.).

Conversely, a new or recharged battery pack 150 may be positioned on the ground G underneath rear portion 110 (e.g., by moving mobile equipment 100 rearward over battery pack 150 and/or moving battery pack 150 under mobile equipment 100 from the rear end) and coupled to attachment points 356. Then, as each piston rod 354 contracts into cylinder barrel 352, battery pack 150 is gradually lifted vertically upward into rear portion 110 by virtue of the couplings between battery pack 150 and attachment points 356. Once lifted, battery pack 150 may be fixed into position within rear portion 110 via any coupling mechanism (e.g., bolts, screws, etc.).

As an alternative to removing and/or inserting battery pack 150 from below rear portion 110, battery pack 150 may be removed and/or inserted from above rear portion 110. In this case, each piston rod 354 extends vertically upward out of cylinder barrel 352, to lift battery pack 150 vertically upward and out of rear portion 110 by virtue of the couplings between battery pack 150 and attachment points 356. Once exposed to the external environment above rear portion 110, battery pack 150 may be coupled to a crane or other system, including potentially a mobile battery-swapping system as described elsewhere herein, and decoupled from attachment points 356, to thereby remove battery pack 150 from mobile equipment 100. Once battery pack 150 has been removed, mobile equipment 100 may be moved forward and/or battery pack 150 may be moved away from mobile equipment 100 with the assistance of another system (e.g., crane, mobile battery-swapping system, etc.), to thereby separate mobile equipment 100 and battery pack 150, so that battery pack 150 may be serviced (e.g., recharged, reconditioned, etc.).

Figure 4A:
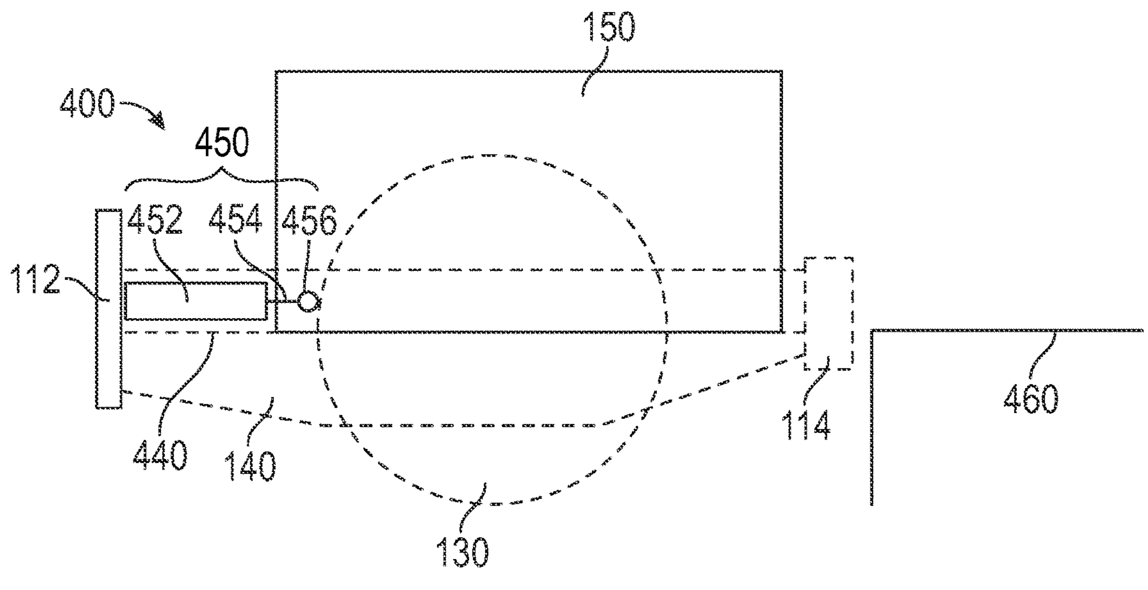
FIGS. 4A and 4B illustrate a horizontal movement system for a battery pack, according to an embodiment.
Figure 4B:
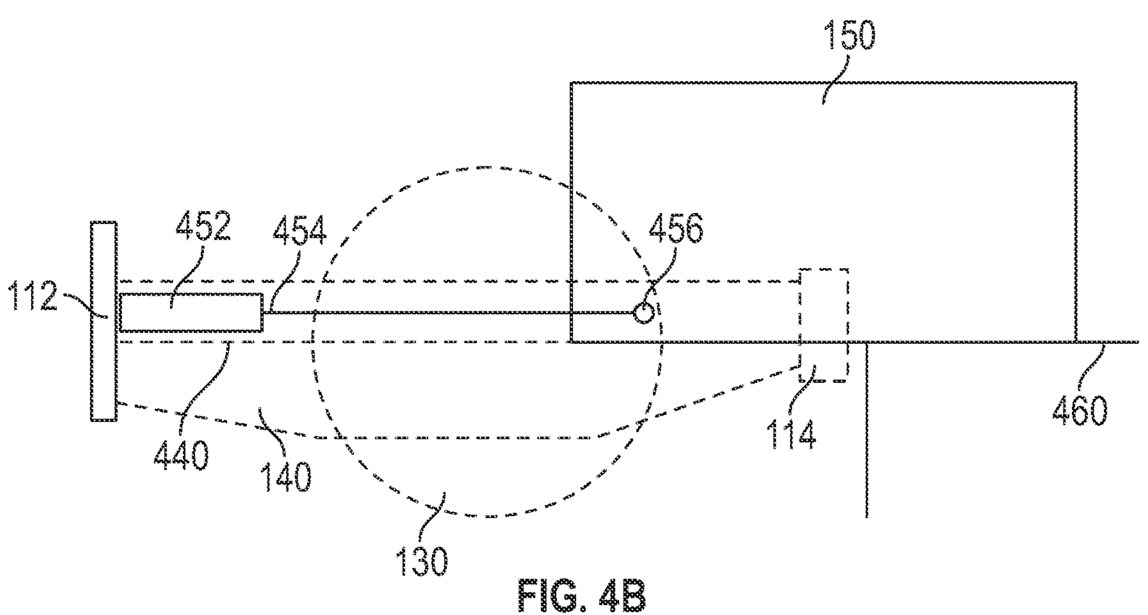

FIGS. 4A and 4B illustrate a horizontal movement system 400 for a battery pack 150, according to an embodiment. Horizontal movement system 400 may comprise one or more horizontal movement elements 450, illustrated as at least one horizontal movement element 450 near a front end of battery pack 150. It should be understood that an identical horizontal movement element 450 may be positioned on the opposite side of battery pack 150, to provide a total of two horizontal movement elements 450 near the front end of battery pack 150. The particular positions of horizontal movement elements 450 are not limiting. However, for force distribution purposes, it is generally contemplated that a horizontal movement element 450 would be positioned on either side of battery pack 150, whether near the front or rear of battery pack 150.

As illustrated in FIG. 4A, each horizontal movement element 450 may be a cylinder, such as a hydraulic cylinder, or an electric actuator. In particular, each horizontal movement element comprises a cylinder barrel 452, a piston rod 454, and an attachment point 456. Each piston rod 454 may extend out of and contract into the respective cylinder barrel 452, and each attachment point 456 may be physically coupled to battery pack 150 using any known attachment mechanism (e.g., bolts, screws, etc.). Each cylinder barrel 452 may be fixed to frame 140 or other component of rear portion 110 of mobile equipment 100.

Each horizontal movement element 450 may be operate in synchrony with each other horizontal movement element 450. As each piston rod 454 extends out of cylinder barrel 452 battery pack 150 is gradually slid horizontally across a surface 440 of frame 140 and, with stiffener 146 removed, through rear bumper 114 and onto loading dock 460, by virtue of the couplings between battery pack 150 and attachment points 456, as illustrated in FIG. 4B. Once on loading dock 460, battery pack 150 may be decoupled from attachment points 456, to thereby remove battery pack 150 from mobile equipment 100.

Conversely, a new or recharged battery pack 150 may be positioned on loading dock 460 near rear bumper 114 and coupled to attachment points 456. Then, as each piston rod 454 contracts into cylinder barrel 452, battery pack 150 is gradually pulled horizontally inward through rear bumper 114 and across surface 440 of frame 140 by virtue of the couplings between battery pack 150 and attachment points 456, until battery pack 150 is seated in a final position in frame 140. Once seated, battery pack 150 may be fixed into position within rear portion 110 via any coupling mechanism (e.g., bolts, screws, etc.). In some embodiments, the movement of the battery pack 150 that is illustrated by FIGS. 4A-4B may be achieved with an angled movement system when combined with an angled end frame 140. For example, movement of the battery pack 150, in connection with the angled end frame 140, includes both a horizontal component and a vertical component, such that battery pack 150 may be slid off and onto frame 140 at a non-zero angle relative to the ground G. For example, respective cylinders and/or electric actuators associated with the angled movement system may be at a non-zero angle with respect to a horizontal axis.

Figure 5A:
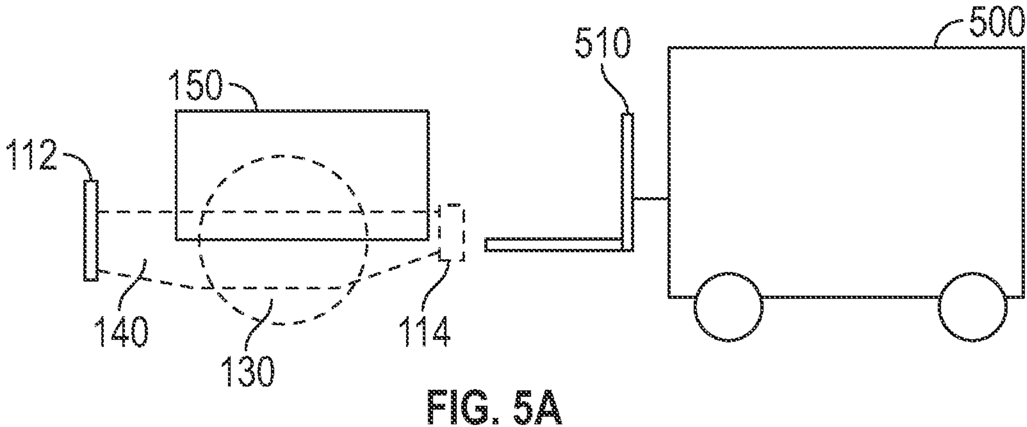
FIGS. 5A-5C illustrate a separate system for moving a battery pack, according to an embodiment.
Figure 5B:
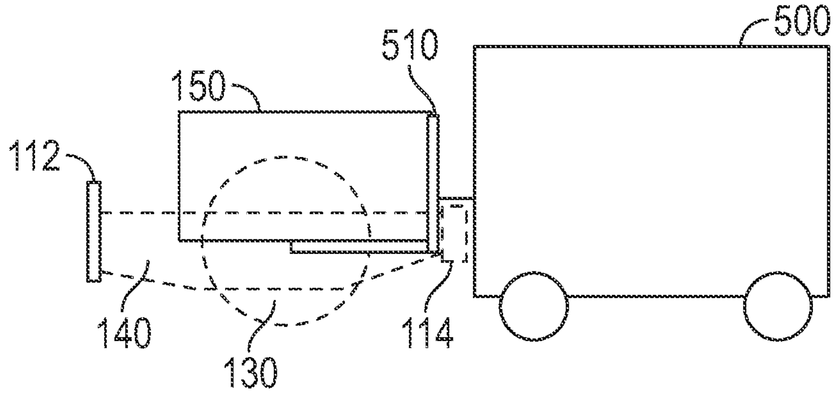
Figure 5C:
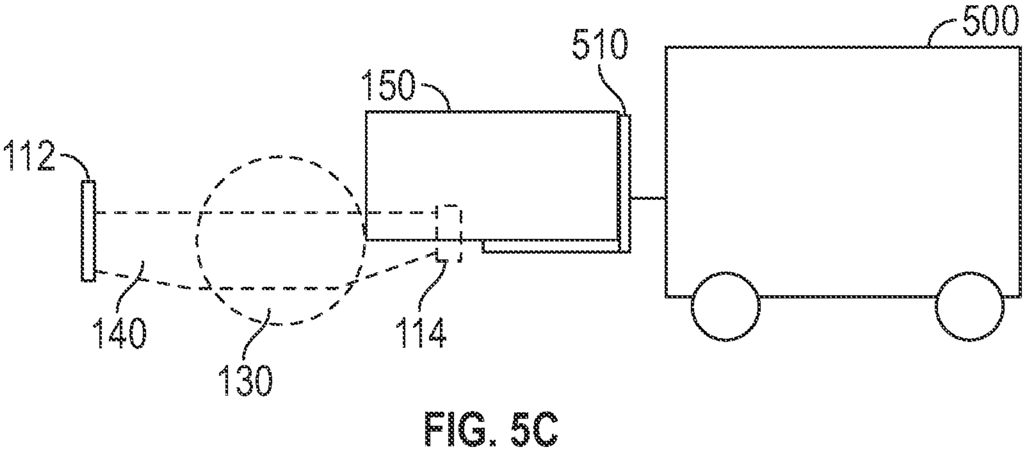

FIGS. 5A-5C illustrate a separate mobile battery-swapping system 500 for moving a battery pack 150, according to an embodiment. Mobile battery-swapping system 500 may comprise a movable platform 510. Platform 510 may be configured to move vertically and/or horizontally. In an embodiment, platform 510 comprises a forklift. In particular, platform 510 may comprise one or more forks that engage with corresponding receptacle(s) on battery pack 150. The corresponding receptacles may comprise a pallet structure configured to be lifted by a forklift. In an alternative embodiment, platform 510 may interface with battery pack 150 in any other suitable manner. As illustrated in FIG. 5A, mobile battery-swapping system 500 may align the interface of platform 510 with the corresponding interface of battery pack 150, while stiffener 146 is removed.

Then, as illustrated in FIG. 5B, mobile battery-swapping system 500 may move platform 510 towards mobile equipment 100 (e.g., forward) to thereby engage the interface of platform 510 with the interface of battery pack 150. Contemporaneously, battery pack 150 may be unfastened from frame 140.

As illustrated in FIG. 5C, with platform 510 engaged with battery pack 150, mobile battery-swapping system 500 may move away from mobile equipment 100 (e.g., rearward), thereby removing battery pack 150 from frame 140. Platform 510 may use gravity to create friction force and pull battery pack 150 out of mobile equipment 100. Additionally or alternatively, battery pack 150 may be fastened to platform 510 to thereby fix battery pack 150 to platform 510. Additionally or alternatively, platform 510 may incorporate a lifting mechanism (e.g., powered by hydraulic, pneumatic, or electric systems) that enables the controlled raising and lowering of battery pack 150 with respect to frame 140. The lifting mechanism may comprise actuators, motors, or other devices that generate the necessary force to lift battery pack 150 from frame 140.

Platform 510 may be designed to securely hold and manipulate battery pack 150 during the extraction process. For example, battery pack 150 may be fixed to platform 510 for transport using bolts, clamps, or other fastening mechanisms. To maintain stability and distribute the weight of battery pack 150 effectively, platform 510 may be designed with load distribution features and structural reinforcements that fit the dimensions of battery pack 150. These features minimize flexing or twisting of platform 510 during the lifting process and provide stability while handling battery pack 150. Platform 510 may incorporate control and safety features like limit switches, sensors, or feedback mechanisms to monitor the position, load, and stability of battery pack 150. Additionally, safety mechanisms such as locking mechanisms or fail-safes can be integrated into platform 510 to prevent accidental release or dropping of battery pack 510.

Conversely, a new or recharged battery pack 150 may be mounted in frame 140 using the reverse procedure. In particular, battery pack 150 may be positioned on platform 510 and brought near rear portion 110 by mobile battery-swapping system 500, so as to align battery pack 150 with frame 140, with stiffener 146 removed. Then, mobile battery-swapping system 500 may move towards mobile equipment 100 to insert battery pack 150 into frame 140. Battery pack 150 may be unfastened from platform 510 and/or fastened to frame 140. Finally, mobile battery-swapping system 500 move away from mobile equipment 100, to thereby disengage platform 510 from battery pack 150 and leave battery pack 150 in frame 140 of mobile equipment 100.

INDUSTRIAL APPLICABILITY

In some industrial contexts, battery-powered mobile equipment 100 may operate in remote locations, including off-road locations. It takes significant time for these mobile equipment 100 to travel to a recharging station to recharge their battery packs 150. Electric mobile equipment 100 often operate in demanding and dynamic conditions, requiring continuous usage throughout the day. Accordingly, disclosed embodiments provide a battery pack 150 that is capable of being quickly swapped for a new or recharged battery pack 150 to maintain a constant operation of electric mobile equipment 100 on site.

The battery-swapping assembly may comprise a frame 140 configured to support a battery pack 150. Frame 140 includes a body 144, two arms 142 extending from the body, and a removable stiffener 146 between the rear ends of the two arms 142. Additionally, the battery-swapping assembly may comprise a vertical movement system 300 or horizontal movement system 500 with elements that include a cylinder barrel, a piston rod, and attachment points to enable battery pack 150 to be quickly unloaded from frame 140 and loaded into frame 140. Alternatively or additionally, a mobile battery-swapping system 500 may be provided that is able to exchange battery packs 500 in the field.

The ability to quickly swap battery packs 150, potentially in the field, provides increased productivity. For instance, mobile equipment 100 no longer need to leave a work area or interrupt tasks to find a recharging station. Additionally, mobile equipment 100 is only out of service for as long as it takes to swap battery pack 150, as opposed to being out of service for as long as it takes to recharge battery pack 150, which may be a significant time period.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in an electric mobile equipment, it will be appreciated that it can be implemented in various other types of equipment and machines with batteries, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A battery-swapping assembly comprising:
- a frame configured to support a battery pack, wherein the frame includes
  - a body,
  - two arms extending from the body, wherein each of the two arms comprises a first end, joined to the body, and a second end,
  - a removable stiffener between the second ends of the two arms,
- a movement system, wherein the movement system includes two or more movement elements, wherein each of the two or more movement elements includes a cylinder barrel, a piston rod that is configured to extend outward from the cylinder barrel and contract inward into the cylinder barrel, and an attachment point at an end of the piston rod, and wherein each attachment point is configured to attach to the battery pack;
- a first traction motor coupled to a first one of the two arms;
- a first ground-engaging member that is driven by the first traction motor;
- a second traction motor coupled to a second one of the two arms; and
- a second ground-engaging member that is driven by the second traction motor.

2. The battery-swapping assembly of claim 1, wherein the piston rod extends vertically outward from the cylinder barrel and contracts vertically inward into the cylinder barrel.

3. The battery-swapping assembly of claim 1, wherein the piston rod extends horizontally outward from the cylinder barrel and contracts horizontally inward into the cylinder barrel.

4. The battery-swapping assembly of claim 1, wherein the piston rod is configured to extend outward from the cylinder barrel in a first direction and contract inward into the cylinder barrel in a second direction, the first direction and the second direction being at a non-zero angle with respect to a horizontal axis.

5. The battery-swapping assembly of claim 1, wherein the frame with the stiffener encloses the battery pack to prevent exposure to an external environment.

6. The battery-swapping assembly of claim 1, wherein the stiffener is configured to detach from the frame by sliding out from between the second ends of the two arms.

7. The battery-swapping assembly of claim 1, wherein the stiffener is configured to rotate horizontally outwards without completely detaching from the frame.

8. The battery-swapping assembly of claim 1, wherein the stiffener is configured to rotate vertically outwards without completely detaching from the frame.

9. The battery-swapping assembly of claim 1, wherein the stiffener is configured to be fixed to the frame in a closed state via one or more fasteners.

10. The battery-swapping assembly of claim 1, wherein each of the first traction motor and the second traction motor has an active suspension.

11. The battery-swapping assembly of claim 1, wherein each of the first traction motor and the second traction motor has motor reduction.

12. The battery-swapping assembly of claim 1, wherein the first ground-engaging member and the second ground-engaging member are aligned along a lateral axis through the two arms, but are not attached to a same axle.

13. The battery-swapping assembly of claim 1, wherein the stiffener is positioned and accessible at a rear end of a mobile equipment.

14. The battery-swapping assembly of claim 1, further comprising a battery pack, wherein the battery pack comprises a pallet structure configured to be lifted by a forklift.

15. A battery swapping system comprising:

the battery-swapping assembly of claim 1; and a mobile battery-swapping system including a platform configured to move one or both of vertically or horizontally, wherein the platform is configured to engage and carry the battery pack through the area between the second ends of the two arms while the removable stiffener is removed.

* * * * *